April 23, 1963 A. A. DICK Re. 25,372

BOAT MOORING APPARATUS

Original Filed Jan. 7, 1958 2 Sheets-Sheet 1

Adolph A. Dick
INVENTOR.

BY Clarence A. O'Brien and Harvey B. Jacobson
Attorneys

April 23, 1963 A. A. DICK Re. 25,372

BOAT MOORING APPARATUS

Original Filed Jan. 7, 1958 2 Sheets-Sheet 2

Adolph A. Dick
INVENTOR.

BY Clarence A. O'Brien and Harvey B. Jacobson
Attorneys

United States Patent Office

Re. 25,372
Reissued Apr. 23, 1963

25,372

BOAT MOORING APPARATUS

Adolph A. Dick, 616 Geronimo Drive, Coral Gables, Fla.

Original No. 2,920,597, dated Jan. 12, 1960, Ser. No. 707,547, Jan. 7, 1958. Application for reissue Jan. 5, 1962, Ser. No. 165,722

13 Claims. (Cl. 114—230)

Matter enclosed in heavy brackets [ ] appears in the original patent but forms no part of this reissue specification; matter printed in italics indicates the additions made by reissue.

My invention relates to improvements in boat mooring apparatus for securing small boats such as launches and the like to one side of a dock.

The primary object of my invention generally stated is to provide efficient, simple apparatus for securing such boats to a side of a dock in variably spaced relation thereto, as occasion may require, and which may be so used with large boats.

To the accomplishment of the foregoing and other objects presently appearing my improved apparatus comprises a pair of laterally spaced mooring arms, means pivotally mounting the arms at one end to the dock for vertical swinging and socket and ball means on the other ends of the arms and the boat forming universal joints which together with vertical swinging of the arms compensate for rise and fall of the boat with the tide and for pitching and rocking of the boat, the arms being extensible and contractile to variably space the boat from the dock, the socket means comprising spring closed pairs of jaws automatically opened in response to movement of the ball means into the pairs, releasable locking means for retaining the pairs of jaws closed, and means for releasing the locking means, all as set forth in detail in the following description, defined in the appended claims, and illustrated in the accompanying drawings in which:

Figure 1:
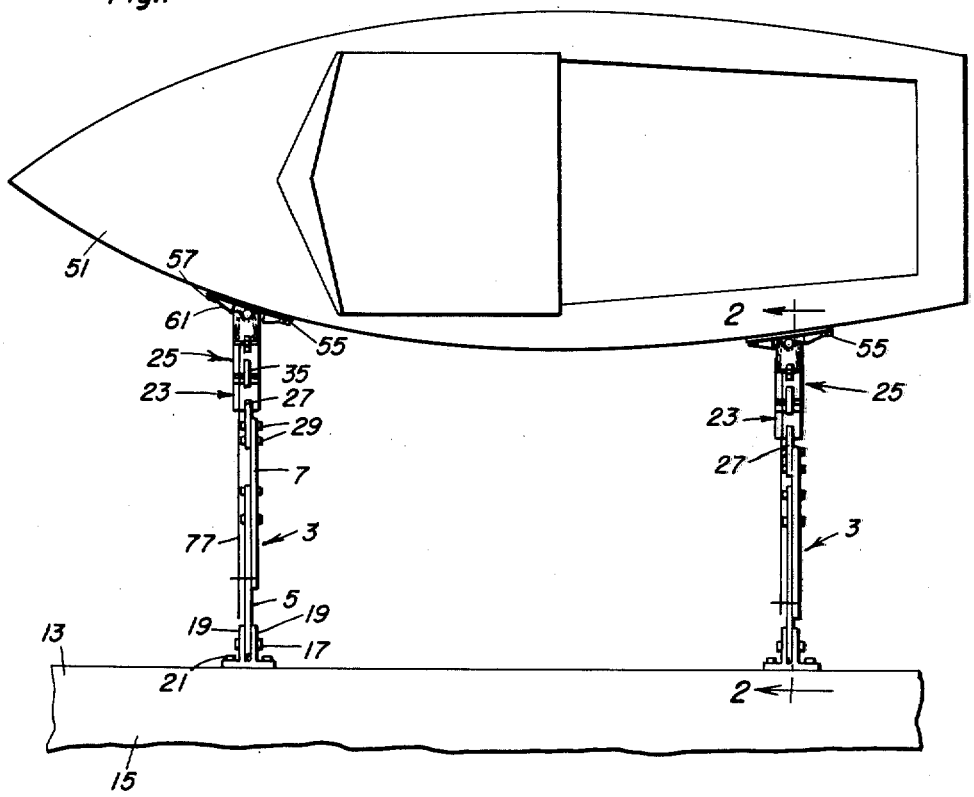
FIGURE 1 is a fragmentary view in plan illustrating a boat secured to a dock by the mooring apparatus of my invention.
Figure 2:
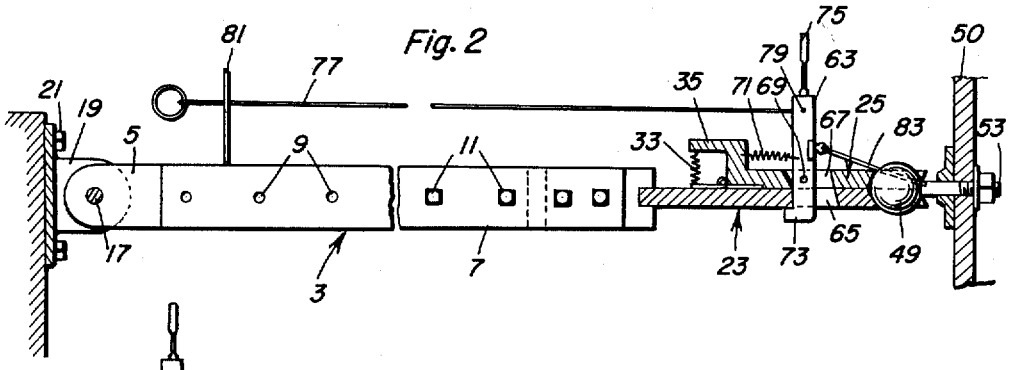
FIGURE 2 is an enlarged fragmentary view in vertical section taken on the line 2—2 of FIGURE 1.

Referring to the drawings by numerals the apparatus of my invention comprises a pair of like mooring arms each designated generally by the numeral 3 and each of which includes a pair of side-by-side flat and rear and front bars 5, 7, provided with longitudinally spaced openings, as at 9, for selective insertion of bolts 11 therethrough to extend or contract the arm. The arms 3 are formed of tempered steel.

The mooring arms 3 are pivotally mounted on one side 13 of a dock 15 in laterally spaced relation for independent vertical swinging and to extend outwardly from the dock by means of pivot bolts 17 in their rear ends and in pairs of lugs 19 between which said rear ends are interposed and which are secured to the side 13 of the dock 15 by bolts 21.

The socket means comprises a pair of socket forming fixed and movable flat jaws 23, 25 of rectangular plate form at the front end of each arm 3. The fixed jaws 23 extend forwardly flatwise from the front ends of the front bars 7 with reduced tail end lugs 27 bolted, as at 29, to one side of said front bars 7. The movable jaws 25 are hinged at rear ends thereof, as at 31, on top of the fixed jaws 23 for swinging upwardly and downwardly into and from flat engagement with the fixed jaws 23 to open and close the pairs of jaws 23, 25 for a purpose presently seen.

Each pair of jaws 23, 25 is normally maintained closed by means of an upright compression spring 33 interposed between the fixed jaw 23 and a rearwardly extending right angled lug 35 on the movable jaw.

The fixed and movable jaws 23, 25 of each pair are provided adjacent the front ends thereof with a pair of complemental C-shaped openings 36, 37 mating when the pair is closed and formed by side walls 34, 38 oppositely beveled, relatively transversely, to form a socket 39 when said jaws 23, 25 are closed. For this purpose the walls 36, 38 are beveled to incline inwardly to the bottom of the fixed jaw 23 and inwardly to the top of the movable jaw 25.

The fixed and movable jaws 23, 25 of each pair are formed with rearwardly converging front entrance throats 41, 43 for the openings 36, 37 for entering ball members on the boat, presently described into the openings 36, 37. The throats 41, 43 are formed by pairs of side walls 46, 48 at opposite sides thereof converging to the openings 36, 37 and which are transversely inclined oppositely on each throat with respect to the other throat to provide cam sides at opposite sides of the throats 41, 43 whereby in response to passing the previously referred ball members through said throats 41, 43 under pressure and when the pairs of jaws 23, 25 are closed, the movable jaws 25 of the pairs will be cammed and swing upwardly of the fixed jaws 23 to open the pair of jaws. For this purpose the throats 41, 43 are formed with elongated side walls 46, 48, which as regards the throat 41, are inclined transversely downwardly and inwardly of the throat 41, whereas, the side walls 48 of the throat 43 are inclined upwardly and inwardly of said throat.

A pair of ball members 49 is mounted in horizontally spaced relation on one side 50 of a boat 51 to seat in the sockets 39 by entering the same through the throats 41, 43 and are proportioned to fit in said sockets. The ball members 50 are provided with threaded nut equipped shanks 53, fastened in the side 50 of the boat 51 to extend outwardly thereof and also extend through and are suitably fixed in a fender plate 55 bolted, as at 57, to said side 50 and provided at opposite sides of the pair of ball members 49 with a pair of outwardly extending longitudinal fender bosses 61 for preventing the ball members 49 from catching on wharfs and other objects.

The locking means comprises an upstanding hooked locking dog 63 for locking each pair of fixed and movable jaws 23, 25 closed, slots 65, 67 in said jaws 23, 25 mating when the pair of jaws 23, 25 is closed and through which the dog 63 depends, a transverse pivot pin 69 pivoting the dog 63 in the slot 67 of the movable jaw 25 for rocking into and from locking position, and a compression spring 71 interposed between said dog 63 and the lug 35 and normally rocking said dog into locking position in which a hooked end 73 underlies the fixed jaw 23. A hand grip 75 on the upper end of each dog 63 provides for manually unlocking the pairs of jaws 23, 25 from a boat for opening. Pull rods 77 pivoted, as at 79, to the dogs 63 and slidably extending rearwardly therefrom through upright guides 81 on the arms 3 provide for manually unlocking the jaws 23, 25 from the dock 13.

Means is provided for automatically unlocking the pairs of jaws 23, 25 in response to entering the ball members 49 in the throats 36, 37 rearwardly under pressure and which comprises the following:

The locking dog 63 of each pair of jaws 23, 25 is provided above the movable jaw 25 with a pair of laterally extending arms 81 [above the movable jaw 25]. A pair of push rods 83 extend forwardly from the pair of arms 81 into the throat 43 of the movable jaw 25 to project into said throat at opposite sides thereof into a position such that when a ball member 49 is pressed rearwardly in the throat the front ends of the rods will be engaged by the ball member and said rods 81 pushed rearwardly to move the locking dog 63 into unlocking position before the ball members 49 start to cam the pair of jaws 23, 25 open.

The push rods 83 are operatively connected at their rear ends to the arms 81 of the locking dog 63 by ball and socket joints 85 and are slidable in longitudinal inclined bores 87 in the movable jaw 25, larger in diameter than the rods 83 to compensate for lateral throw of said rods. As will be clear the rods normally project into the throats 43 but are pushed inwardly by the ball members sufficiently to permit the ball members to pass between their front ends. Bores 89, 91 in the fixed and movable jaws 23, 25 provide for padlocking said jaws closed if desired.

In actual practice the boat 51 is maneuvered up to the side 13 of the dock 15. Each mooring arm 3 is swung upwardly by an attendant on the boat 51 or dock 15, one at a time into a position to insert one of the ball members 49 into the throats 41, 43 of the jaws 23, 25 on the arm. An attendant may then by pulling on the arm and warping the boat force the ball members into and through the throats 41, 43. As the ball member enters the throats 41, 43 the locking dog 63 is automatically unlocked in the manner already described and the movable jaw 25 cammed open by coaction of the ball members 49 with the cam side walls 46, 48 of the throats 41, 43 so that the ball member 49 may enter the openings 36, 37 and then the pair of jaws 23, 25 will be snapped closed by the spring 33 by closing of the movable jaw 25 onto the fixed jaw 23 to form the socket 39.

When it is desired to release the boat 51 the locking dogs 63 are moved into releasing position by means of the hand grip 75 or by an attendant on the dock 13 pulling on the pull rod 77. When the locking dogs 63 are thus unlocked pull on the ball members 49 outwardly by the boat 51 will cam the pairs of jaws 23, 25 open. This occurs by camming coacting of the ball members 49 with the inclined side walls 34, 36 of the openings 36, 37 and the inner ends of the side walls 46, 48 of the throats 41, 43. Obviously the pairs of jaws 23, 25 may be unlocked manually instead of automatically if desired by means of the hand grip 75 or pull rod 77 preparatory to entering the ball members 49 in the throats 41, 43.

As will be understood the mooring arms 3 when not in use hang pendant and out of the way and said arms may be extended or contracted as desired for vertical swinging to compensate for variations in rise and fall of different tides.

Figure 6:
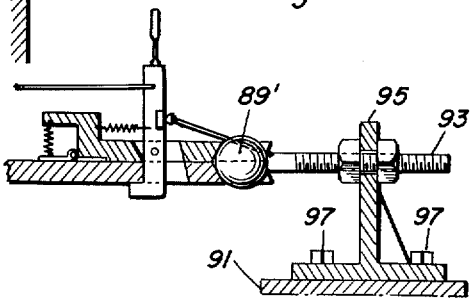
FIGURE 6 is an enlarged view in vertical section of a modified embodiment of the invention.
Figure 3:
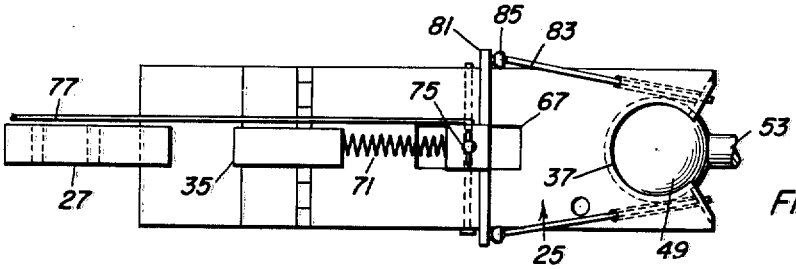
FIGURE 3 is an enlarged fragmentary plan view of one of the pairs of jaws, and the locking means therefor and means for releasing the locking means.
Figure 4:
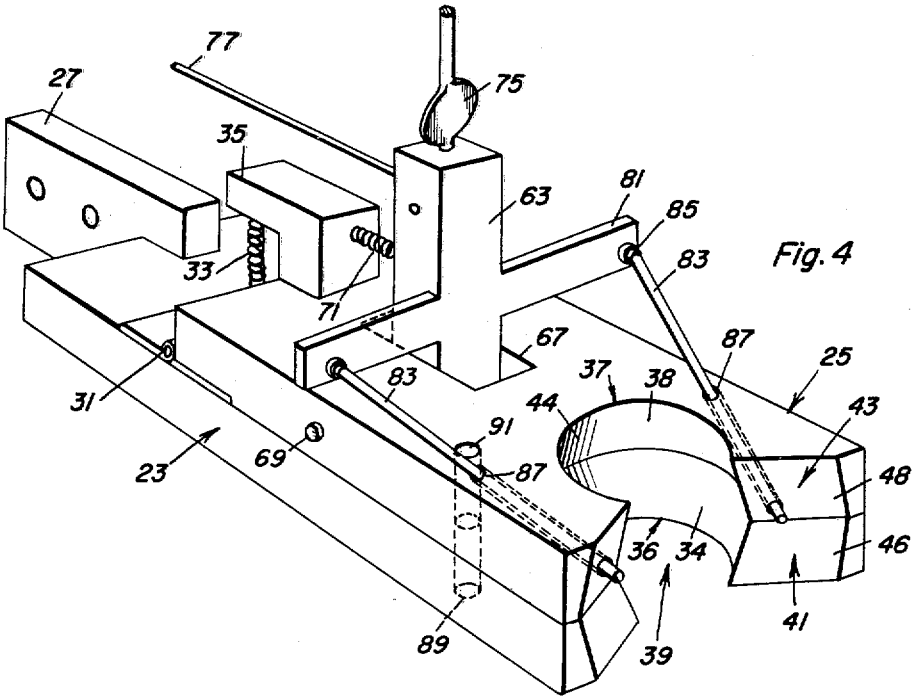
FIGURE 4 is an enlarged perspective view of the same.
Figure 5:
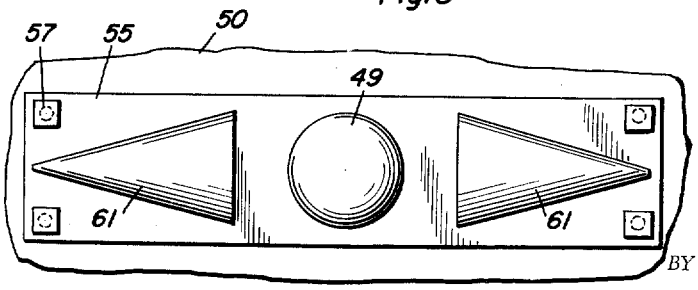
FIGURE 5 is an enlarged fragmentary view in side elevation of the ball means on the boat.

In the modified embodiment shown in FIGURE 6, the ball members 89' are secured on top of a boat gunwale 91 by a threaded nut equipped shank 93 extended through a suitable bracket 95 bolted, as at 97, on said gunwale. Otherwise the construction is the same as in the first described embodiment.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. Boat mooring apparatus comprising in combination with a dock, a pair of mooring arms having front and rear ends, pivot means on the rear ends of said arms attached to a side of the dock to space said arms apart laterally for vertical swinging movement, a pair of forwardly extending flat jaws of plate form fixed on the front ends of said arms, respectively, a pair of forwardly extending flat jaws of plate form hinged on top of the fixed jaws for vertical opening and closing movement, said fixed jaws and the movable jaws hinged on top thereof forming complemental pairs of fixed and movable jaws having free front ends, the complemental pairs of fixed and movable jaws having in the front ends thereof openings and front entrance throats to said openings, the openings and entrance throats in the complemental pairs of jaws mating when the movable jaws are closed to form a pair of ball receiving sockets in said complemental pairs of jaws for a pair of ball members inserted into said sockets through the mating throats, and a pair of ball members insertable through the mating throats into the sockets and attachable to a boat, said mating throats having cam sides for camming the movable jaws open in response to insertion of said ball members through said mating throats, and spring means interconnecting the fixed and movable jaws of each complemental pair and yieldingly maintaining the movable jaws closed.

2. The combination of claim 1, and releasable spring loaded locking members on the movable jaws lockably engaging the fixed jaws in response to closing of the movable jaws.

3. The combination of claim 1, said mating openings having sides bevelled transversely of the jaws and oppositely in said openings relatively whereby the mating openings form a socket having a concave side.

4. The combination of claim 1, said throats converging rearwardly to the openings to facilitate insertion of the ball members therethrough into said sockets.

5. The combination of claim 1 and a bar mounting for said ball members having fender means thereon to guard said ball members against injury.

6. Boat mooring apparatus comprising in combination with a dock, a pair of mooring arms having front and rear ends, means for attaching the arms by the rear ends thereof to a side of the dock to be extended outwardly therefrom in laterally horizontally spaced relation, a pair of forwardly extending flat jaws of plate form fixed to the front ends of said arms, respectively, a pair of forwardly extending flat jaws of plate form hinged on top of the fixed jaws, respectively, for vertical opening and closing movement, said fixed and movable jaws on top thereof forming complemental pairs having free front ends, the fixed and movable jaws of the complemental pairs having in the front ends thereof openings and entrance throats to said openings, the openings and entrance throats in the complemental pairs of jaws mating when the movable jaws are closed to form a pair of ball receiving sockets in said complemental pairs of jaws for a pair of balls inserted into said sockets through the mating throats and a pair of ball members insertible through the mating throats into the sockets and attachable to a boat, said mating throats having opposite cam sides for camming the movable jaws open in response to insertion of said ball members through said mating throats, releasable locking means for the movable jaw of each complemental pair of jaws for retaining the movable jaws closed, and means for automatically releasing said locking means in response to insertion of the ball members through the mating throats.

7. The combination of claim 6, said last means comprising a pair of rearwardly sliding push rods in the movable jaw of each complemental pair of jaws operatively connected to the locking means of the pair and extending forwardly out of the opposite sides of the throats for operative engagement by a ball pressed rearwardly into the mating throats of said complemental pairs of jaws.

8. The combination of claim 6 and means for manually releasing said locking means from the dock.

9. Boat mooring apparatus comprising in combination with a dock, a pair of mooring arms having front and rear ends, pivot means on the rear ends of said arms attached to a side of the dock to space said arms apart laterally horizontally and for vertical swinging movement, a pair of forwardly extending flat jaws of plate form fixed on the front ends of said arms, respectively, a pair of forwardly extending jaws of plate form hinged on top of the fixed jaws, respectively, for vertical opening and closing movement, said fixed and movable jaws forming complemental pairs having free front ends, the fixed and movable jaws of the complemental pairs having in the front ends thereof openings and front entrance throats to said opening, the openings and entrance throats of the complemental pairs of jaws mating when the movable jaws are closed to form ball retaining sockets for a pair of balls inserted through the mating throats into the sockets, and adapted to be fixed to a boat.

*10. A connecting assembly comprising a pair of complementary jaws, means interconnecting said jaws for enabling the jaws to move apart when a projection is inserted between or removed from between the jaws, means resiliently retaining the jaws adjacent each other, the inner surface of each jaw including a recess whereby the recesses cooperate to form a socket between said jaws, at least one of said jaws having an entrance throat formed therein defining a pair of projecting arms spaced apart at their free ends and communicating with said recess, and cam surfaces on said one of said jaws at the outer end of said throat for camming the jaws away from each other when a projection is forced into the outer end of said entrance throat, lock means releasably retaining the jaws in their closed adjacent position, and means automatically releasing said lock means in response to movement of a projection into engagement with the cam surfaces.*

*11. The structure as defined in claim 10 wherein said lock means includes a latch interconnecting said jaws when in their closed position, manual means for releasing the latch and permitting movement of the jaws away from each other for releasing a projection disposed within the recess.*

*12. The structure as defined in claim 11 wherein said means automatically releasing said lock means includes an actuating rod connected with the latch, said jaw with the cam surfaces having a bore receiving said rod, the end of the rod remote from the latch normally extending beyond one of the cam surfaces thereby being positioned for engagement by a projection.*

*13. A connecting assembly comprising a pair of complementary jaws, means interconnecting said jaws for enabling the jaws to move apart when a projection is inserted between or removed from between the jaws, means resiliently retaining the jaws adjacent each other, the confronting surfaces of said jaws defining a socket therebetween, said jaws, when in the closed position, defining an entrance throat therebetween communicating with said socket, cam surfaces on one of said jaws at the outer end of said throat for camming the jaws away from each other when a projection is forced into the outer end of said entrance throat, lock means releasably retaining the jaws in their closed adjacent position, and means automatically releasing said lock means in response to movement of a projection into engagement with the cam surfaces.*

References Cited in the file of this patent or the original patent

UNITED STATES PATENTS

| | | |
|---|---|---|
| 687,183 | Kolander | Nov. 19, 1901 |
| 843,458 | Hass | Feb. 5, 1907 |
| 1,280,013 | Goddard | Sept. 24, 1918 |
| 2,155,043 | Gorskey | Apr. 18, 1939 |
| 2,248,005 | Lyman | July 1, 1941 |
| 2,387,352 | Radick | Oct. 23, 1945 |
| 2,556,748 | Buckley | June 12, 1951 |
| 2,902,737 | Moran | Sept. 8, 1959 |